Feb. 1, 1927.
E. D. HOOEY
1,616,223
BATHHOUSE FOR CAGE BIRDS
Filed May 13, 1926
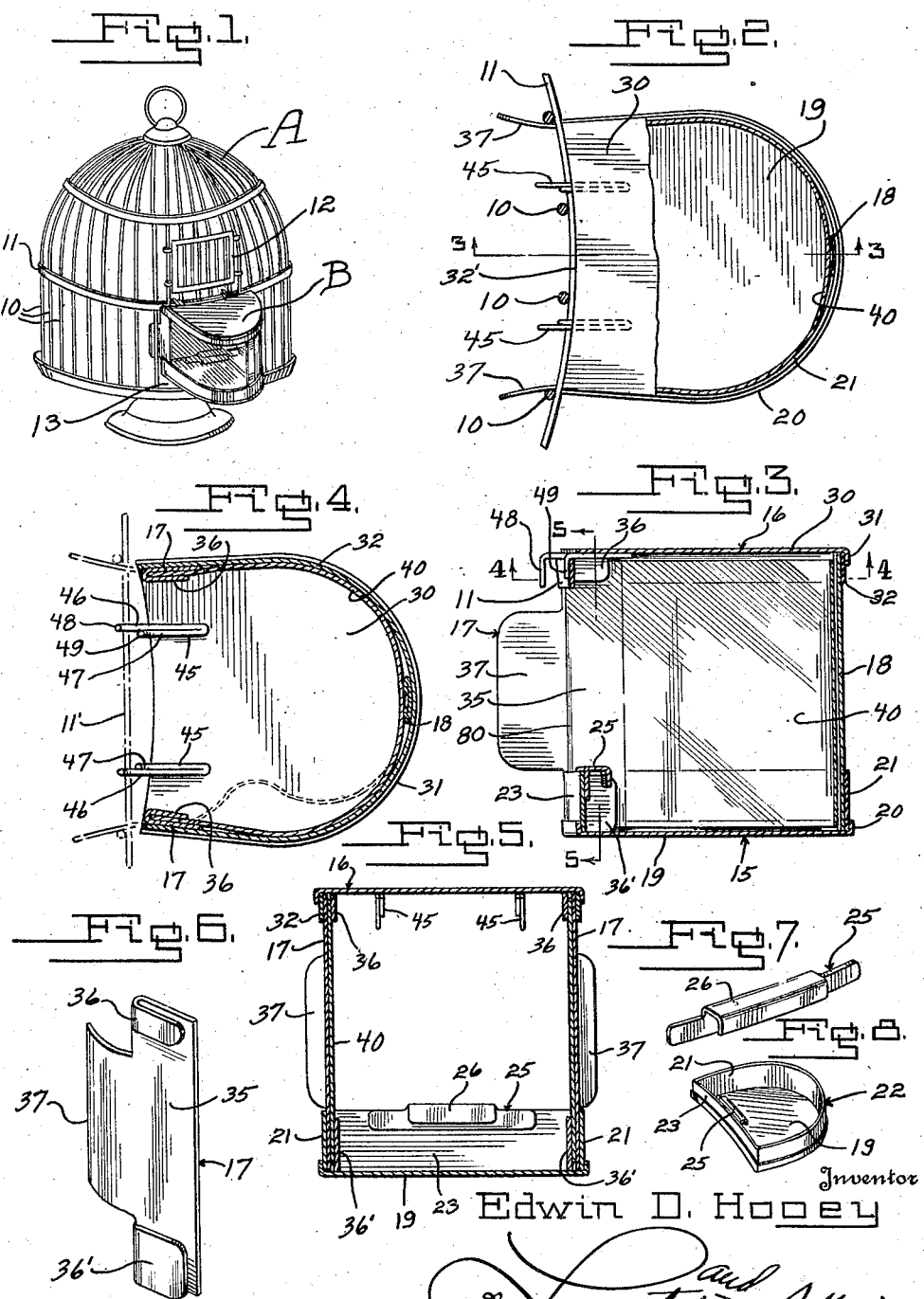
Inventor
Edwin D. Hooey
By Lancaster and Allwine
Attorneys Patented Feb. 1, 1927.

1,616,223

UNITED STATES PATENT OFFICE.

EDWIN D. HOOEY, OF MINNEAPOLIS, MINNESOTA.

BATHHOUSE FOR CAGE BIRDS.

Application filed May 13, 1926. Serial No. 108,922.

The present invention relates to bird cages, and the primary object of the invention is to provide an improved type of bath house for attachment to bird cages of various makes, models and shapes, in order to permit of the bird being allowed to bathe without splashing the water about in the cage.

A further object of the invention is to provide a novel type of bath house for attachment to bird cages which is of such construction as to cause the same to be relatively light, thus permitting of the attachment being readily applied to the cage without liability of the cage being tipped when the device is attached to one side of the cage.

A still further object of the invention is to provide a device of this character which is adapted for positioning over the door opening of the cage and embodying novel features of attachment whereby the same is held against becoming detached from the cage and also in a manner to prevent relative shifting or tilting of the device with respect to the cage.

A still further object of the invention is to provide a bath house for bird cages which will serve efficiently for its intended purpose, one which will be neat in appearance, and which may be constructed entirely from sheet materials of a not readily broken nature.

Other objects and advantages of the invention will be apparent during the course of the following detailed description, taken in connection with the accompanying drawing forming a part of this specification and in which drawing:

Figure 1 is a perspective view of a bird cage and showing the bath house applied thereto.

Figure 2 is a top plan view of the bath house, showing a portion thereof broken away and showing the house as applied to a bird cage of the round type.

Figure 3 is a sectional view on line 3—3 of Figure 2.

Figure 4 is a horizontal section on line 4—4 of Figure 3 and looking in the direction of the arrows, and showing the manner of attachment of the bath house to a square or oblong type of bird cage.

Figure 5 is a vertical section on line 5—5 of Figure 3 and looking in the direction of the arrows.

Figure 6 is a perspective view of one of the combined supports and attaching sections of the bath house.

Figure 7 is a perspective view of the perch or step of the bath house.

Figure 8 is a perspective view of the lower portion of the bath house, and which constitutes a tub in which water is placed for the bird to bathe.

Referring to the drawing in detail, and wherein similar reference characters designate corresponding parts throughout the several views, the letter A designates a conventional type of bird cage, and B the bird bath house adapted for detachable connection with the cage at the door opening thereof.

The cage A in the example illustrated is of the round type, constructed of a plurality of vertically disposed rods or bars 10 connected intermediate their ends by a number of spaced horizontal circular rails 11. Mounted for vertical sliding movement upon certain of the bars 10, is a door 12 which normally serves as a closure for the opening 13 formed between the lowermost rail 11 and the bottom of the cage. The lower ends of a desired number of adjacent bars 10 are removed below the lowermost rail for forming of the doorway or opening 13.

The improved bath house B, and which is of substantially horseshoe shape in plan, comprises a sheet metal frame structure embodying a lower or tub section 15, and a top section 16 connected with the lower section 15 as by the combined guard and retaining uprights 17 and the upright 18.

The lower section 15 embodies a bottom or based plate 19 which is of substantially horseshoe shape in plan, and is provided with the upwardly bent marginal flange 20. Secured at its lower edge to the upper side of the base plate 19, and inwardly of the marginal flange 20 as by soldering or the like, is a band of sheet metal forming a rim 21, and which rim together with the base plate 19 forms a tub 22 having a transversely concaved front wall 23. This tub 22 forms a receptacle into which water may be placed for the bird to bathe. Secured to the inner side of the transversely concaved front wall 23, is a suitable step or perch 25 which is also formed from sheet metal, and upon which the bird may stand while passing from the cage to the bath house. As will be observed in Figure 3, the rest section 26 of the perch 25 extends inwardly from the front wall 23 in order that the wall 23 will properly engage the cage to which the bath house is attached.

The top section 16 and which is of a shape similar to that of the lower section 15, embodies a top or cover plate 30 provided with a downturned flange 31 which terminates at the ends of the front concaved edge 32' of the plate. Secured inwardly of the flange 31, is a rim 32 which also terminates at the ends of the front concaved edge 32' of the plate 30. The object in not continuing the flange 31 and rim 32 across the front concaved edge 32 of the cover plate, is to permit of the water to be readily drained from the bath house upon reversing the house or turning the same up-side-down.

Referring now to the combined guard and retaining uprights 17, and which may also be struck from sheet metal, the same embody plate sections 35 which are adapted to be suitably secured at their upper and lower ends to the inner sides of the rims 32 and 21 respectively at the front portions of the sections 15 and 16. Provided at the upper and lower ends of the plate sections 35, and preferably formed integral with the plate sections, are upper and lower clips 36 and 36' respectively, and which clips preferably overlie the inner faces of the plate sections in slightly spaced parallel relation as illustrated in Figure 6. Formed integral with and at the forward edge of the plate sections 35, and between the clips 36 and 36', are oppositely inclined wings 37 which are adapted to engage with the side bars or rods 10 of the door opening 13 as clearly illustrated in Figure 2. These wings 37, not only by reason of their engaging the side bars of the door opening 13 prevent tilting of the bath house, but also serve as guards for preventing the bird from escaping through any side openings which may be formed by attachment of the house to various types of bird cages. By reason of these wings 37 being of both a yielding and bendable nature, will serve in the first instance for holding the house in tight engagement against the cage A by reason of the flaring of the wings, and in the second instance will permit of the wings being bent outwardly should the door opening 13 of the cage be relatively wider than the opening 80 formed at the front wall of the bath house. It will readily be apparent upon observing Figures 2 and 4, the manner in which the oppositely flaring wings 37 will serve for drawing the housing toward the bird cage to which the housing is attached.

The upright 18 and which is disposed at the outer end of the sections 15 and 16, merely serve as a support for the outer ends of the sections.

Fitting inwardly of the rims 21 and 32 of the sections 15 and 16 respectively, is a flexible sheet of celluloid, isinglass, pyralin or other diaphanous material 40, capable of being rolled or readily flexed. This sheet of diaphanous flexible material 40 is of a width slightly less than the distance between the top and base plates 30 and 19 respectively, and is adapted to have its end edges fit within the clips 36 and 36' of the respective retaining uprights 17. This sheet 40 serves as a window for admitting light to the bath house, and it will readily be observed from Figure 3 that water within the tub 22 is prevented from splashing or leaking from the bath house when the sheet is in position. When desiring to move the flexible sheet of diaphanous material 40 from the frame structure of the bath house, for cleaning of the window, it is merely necessary to first flex the sheet inwardly as shown by dotted lines in Figure 4 and which will release one end of the sheet from the clips 36 and 36' and allow the sheet to be rolled and removed from the frame.

Attaching hooks 45 secured to the under side of the front portion of the cover plate 30, are of special formation for permitting of the house being readily attached to either a round type of cage as illustrated in Figure 2 or to a cage having parallel side walls as illustrated in Figure 4. These hooks 45 are preferably formed from wire of a suitable gage and nature bent upon itself intermediate its ends for providing long and short arms 46 and 47 respectively. These arms 46 and 47, and each of which project past the concaved front face of the bath house, are each provided at their projecting ends with downturned hook portions 48 and 49 respectively, and which hook portions are unequally spaced from the front concaved face of the bath house, the hook portion 48 of the long arm 46 being spaced a greater distance from the front concaved face of the bath house and that of the hook portion 49 of the short arm 47. The short arm 47, together with its downturned hook portion 49 serve as means for attachment of the bath house to the round or oval types of bird cages, the hook portions 49 being adapted to engage the rail 11 above the door opening 13. The downturned hook portions 48 of the long arms 46 are disposed in a plane forwardly of the plane of the front concaved face of the bath house as clearly illustrated in Figures 3 and 4, and by reason of the hook portions 48 being so disposed forwardly of the plane of the front space of the house, permits of the hook portions 48 being positioned over the rail 11' extending above the door opening of a bird cage having a straight side wall. The material from which these hooks 45 are formed is preferably of a nature to permit of the hook portions 48 and 49 being bent downwardly at different points along their respective arms for adapting of the attaching hooks to variously constructed bird cages without liability of the wires breaking when being bent at the proper position along the arms thereof.

From the foregoing description it will be apparent that an extremely simple, novel, and lightly constructed bath house for cage birds has been provided embodying novel features of construction whereby the same is readily applicable to various types of bird cages and which when applied to the cage is firmly held against possible tilting from its adjusted horizontal position at the door opening of the bird cage.

Changes in detail may be made to the specific form of the invention herein shown and described, without departing from the spirit of the invention or the scope of the following claims.

I claim:

1. A bath attachment for bird cages comprising a housing having an open front side for aligning with the door opening of a bird cage, attaching members carried by the top portion of the housing for engagement with the rail above the cage door opening, and wings projecting forwardly of the front side of the housing for engaging the vertical sides of the door opening.

2. A bath attachment for bird cages comprising a housing having an open front side for aligning with the door opening of a bird cage, attaching hooks carried by the top wall of the housing and projecting forwardly thereof for hooking engagement about the rail above the cage door opening, and yieldable wings projecting forwardly from the side edges of the front side of the housing for yieldably engaging the vertical walls of the cage door opening.

3. A bath attachment for bird cages comprising a housing having an open transversely concaved front side for aligning with the door opening of a bird cage, and attaching hooks fixedly carried by the top wall of the housing and each embodying depending hook portions spaced unlike distances from the front concaved side of the housing.

4. A bath attachment for bird cages comprising a housing having an open transversely concaved front side for aligning with the door opening of a bird cage, and attaching hooks carried by the top wall of the housing and each embodying a long and a short arm projecting forwardly from the front side of the housing, said short arms being provided at their forward ends with downturned hook portions and said long arms being provided at their outer ends with downturned hook portions spaced forwardly of said first mentioned hook portions and past the plane of the front side of the housing.

5. A bath attachment for bird cages comprising a housing having an open transversely concaved front side for aligning with the door opening of a bird cage, and attaching hooks carried by the under side of the top wall of the housing, comprising lengths of wire bent upon themselves intermediate their ends for forming long and short arms projecting one further than the other past the front concaved side of the housing and each having a downturned hook portion formed at its forward end.

6. A bath attachment for bird cages comprising a housing having an open front side for aligning with the door opening of a bird cage, means for detachably connecting the housing with the cage, clips carried by the upper and lower portions of the housing at the forward edges thereof, and a flexible strip of diaphanous material fitting in the housing and forming the vertical closed walls thereof and having its end edges removably fitting in said clips.

7. A bird bath house for detachable connection with a bird cage, comprising a lower section provided with a marginal rim and forming a tub, a top section of like outline as the lower section and provided with a marginal depending rim, uprights connecting the forward side edges of the upper and lower sections, inwardly formed clips carried by the upper and lower end of said uprights, a flexible sheet of transparent material arranged inwardly of the rims of the top and lower sections and having its end edges fitting in the clips of said uprights, and attaching hooks carried by the top section and projecting forwardly of the open front side of the housing.

8. A bird bath house for detachable connection with a bird cage, comprising a housing formed from sheet metal and embodying a lower section forming a tub having a transversely concaved front wall, a perch embodying a rest section, disposed inwardly of the upper edge of the concaved front wall, a top section of like outline in plan as that of the lower section and having a transversely concaved front edge, uprights connecting the forward side edges of the top and lower sections, having inwardly formed clips at their upper and lower ends and forwardly extending wings formed intermediate the clips, a transparent window having its end edges engaging in said clips, and forming the side walls of the housing, and attaching hooks carried by the top section and projecting forwardly of the front wall of the housing.

EDWIN D. HOOEY.